(12) United States Patent
Berger

(10) Patent No.: US 10,856,048 B2
(45) Date of Patent: Dec. 1, 2020

(54) SYSTEM AND METHOD FOR SOCIAL INTERACTION ABOUT CONTENT ITEMS SUCH AS MOVIES

(71) Applicants: Sony Corporation, Tokyo (JP); Sony Pictures Technologies Inc., Culver City, CA (US)

(72) Inventor: Richard Berger, Westlake Village, CA (US)

(73) Assignee: SONY PICTURES TECHNOLOGIES INC., Culver City, CA (US)

(*) Notice: Subject to any disclaimer, the term of this patent is extended or adjusted under 35 U.S.C. 154(b) by 0 days.

(21) Appl. No.: 16/537,688

(22) Filed: Aug. 12, 2019

(65) Prior Publication Data

US 2019/0364337 A1 Nov. 28, 2019

Related U.S. Application Data

(63) Continuation of application No. 13/336,417, filed on Dec. 23, 2011, now Pat. No. 10,390,090.

(Continued)

(51) Int. Cl.
| | |
|---|---|
| H04N 21/466 | (2011.01) |
| G06Q 10/10 | (2012.01) |
| G06Q 50/00 | (2012.01) |
| H04N 21/258 | (2011.01) |
| H04N 21/475 | (2011.01) |
| H04N 21/4784 | (2011.01) |
| H04N 21/4788 | (2011.01) |

(52) U.S. Cl.
CPC ........... *H04N 21/466* (2013.01); *G06Q 10/10* (2013.01); *G06Q 50/01* (2013.01); *H04N 21/25891* (2013.01); *H04N 21/4756* (2013.01); *H04N 21/4784* (2013.01); *H04N 21/4788* (2013.01)

(58) Field of Classification Search
CPC ...... G06Q 30/02; G06Q 10/10; H04L 67/306; H04L 67/22; G06F 17/30766; H04N 21/25891; H04N 21/4788
See application file for complete search history.

(56) References Cited

U.S. PATENT DOCUMENTS 8,745,502 B2 * 6/2014 Snibbe .................. G06Q 10/10
                                                    715/733
9,110,953 B2 * 8/2015 Steinberg ............. H04N 21/454
(Continued)

*Primary Examiner* — Shean Tokuta
(74) *Attorney, Agent, or Firm* — Mayer & Williams PC

(57) ABSTRACT

Systems and methods are provided for sharing movie information online. In one implementation, the user of an online movie service can share information about the contents of a library or other such rights locker, e.g., under Ultraviolet™ and DECE. Users may also share likes and dislikes. The movie service may make suggestions based on the contents of the user's library and the contents of other user's libraries, such as those of the user's designated friends. A user can become a follower or fan of another user and receive recommendations based on the target user's profile or specific recommendations made by the target. The user can receive a credit on their account or on a related account when another user makes a purchase that is attributable to that user, e.g., from a recommendation. A user may be designated as an influencer when followed by a sufficient number of other users.

21 Claims, 8 Drawing Sheets

Related U.S. Application Data

(60) Provisional application No. 61/428,545, filed on Dec. 30, 2010.

(56) References Cited

U.S. PATENT DOCUMENTS

| | | | | |
|---|---|---|---|---|
| 2003/0216942 A1* | 11/2003 | Hawks | G06Q 30/02 | 705/2 |
| 2006/0195462 A1* | 8/2006 | Rogers | G11B 27/105 | |
| 2008/0092182 A1* | 4/2008 | Conant | G06Q 30/0269 | 725/109 |
| 2008/0109306 A1* | 5/2008 | Maigret | G06Q 30/0275 | 705/14.46 |
| 2008/0222199 A1* | 9/2008 | Tiu | H04L 29/08 | |
| 2009/0083117 A1* | 3/2009 | Svendsen | G06F 16/683 | 709/205 |
| 2010/0037752 A1* | 2/2010 | Hansson | G06F 16/637 | 84/601 |
| 2010/0299601 A1* | 11/2010 | Kaplan | H04L 65/60 | 715/716 |
| 2011/0004692 A1* | 1/2011 | Occhino | H04L 67/16 | 709/228 |
| 2011/0060649 A1* | 3/2011 | Dunk | G06Q 30/0255 | 705/14.53 |
| 2011/0161159 A1* | 6/2011 | Tekiela | G06Q 30/0242 | 705/14.41 |
| 2011/0202430 A1* | 8/2011 | Narayanan | G06F 16/2471 | 705/27.1 |
| 2012/0143871 A1* | 6/2012 | Liebald | H04L 65/60 | 707/738 |
| 2013/0167168 A1* | 6/2013 | Ellis | H04N 21/44218 | 725/12 |

\* cited by examiner

SYSTEM AND METHOD FOR SOCIAL INTERACTION ABOUT CONTENT ITEMS SUCH AS MOVIES

CROSS-REFERENCE TO RELATED APPLICATIONS

This application is a continuation of U.S. application Ser. No. 13/336,417, filed Dec. 23, 2011, which claims benefit of priority of U.S. Provisional Patent Application Ser. No. 61/428,545, filed Dec. 30, 2010, entitled "MOVIE SOCIAL APP", owned by the assignee of the present invention and incorporated herein by reference in its entirety.

BACKGROUND

Delivery of online audio video content such as movies, television shows, and music has transformed the way people receive such content items. In the same way, social networking has transformed the way people interact. For example, a news item which interests one user of the social networking site and is posted on the site may lead to a long thread where the user and his or her friends interact with each other by commenting on the post. In the context of movies, viewers enjoy sharing their likes and dislikes about movies. But while a user may post an entry about a content item such as a movie, there is no convenient way to post such an entry where the entry has included clips or other aspects of the movie generally reserved to the rights owner. Nor is there a way to leverage information about users to provide recommendations about specific content items.

SUMMARY

The system and method provide a way to share and interact online about content items, such as movies. The system and method can be situated as a social networking module within a rights administrator service or may interact with an external social networking site to provide interactions. In one implementation, a user of an online movie service can share information about the contents of a library or rights locker, e.g., under the Ultraviolet™ ("UV") system developed by the DECE Consortium. The information may be shared with one or more friends associated with the user. The friends and the user may then comment on the contents, sharing their likes and dislikes.

Numerous variations are possible. For example, the system and method may make suggestions or recommendations based on the contents of the user's library and the contents of one or more friends' libraries, or even based on information from external sites or from users viewed as "influencers", influencers generally having a large number of followers, fans, or friend. A user can become a follower or fan of another user and receive recommendations based on the target's profile or based on specific recommendations made by the target. A subject user can receive a credit when another user or viewer of the recommendation or entry performs a transaction such as a purchase or rental that is attributable to the subject user, e.g. from a recommendation or posted entry pertaining to the transacted content item.

In one implementation, a rights administrator service such as the UV system operates with a social networking site, such as Facebook®. A user can place information about content items such as movies on his or her page. The user can also grant various levels of access to his or her library, within the rights administrator service or social networking site, to other users. For example, the user can set that his or her designated friends are allowed to see what is in the library. The user can also designate that certain users are allowed to make comments about items in the library. The service can provide access to clips for items in users' libraries to allow other users to sample the items.

The service can analyze the content of the user's library to establish a "taste profile" of the user. The service can then compare taste profiles with an analogous metadata in movie profiles and/or user libraries to make recommendations, either from within one or more friends' libraries or in general. The use of a taste profile is not, however, required. The analysis may simply take account of metadata in users' libraries to analyze and determine similarities.

The service can also interact with the social networking site to make suggestions to unrelated users, such as for movies or for potential new friends, e.g., due to common interests in movie genres. The rights administrator service could promote social interaction, such as through creating virtual clubs that automatically collect users with similar taste profiles or similar interests in movies. The service can also interact with follower or fan functionality of the site or an external site to make recommendations or to identify popular or influential actors, e.g., in the area of movies. For example, a user could be designated as a "taste maker" when a certain number of people, e.g., a predetermined threshold, follow the user or take actions based on the user's recommendations.

Besides interacting through a separate social networking site, the rights administrator service may include a social networking module to allow social networking features and functionality within its own group of users. The users can discuss and promote movies with each other and receive benefits for completed transactions, e.g., rentals, sales, streaming, and the like. In another implementation, the rights administrator service may operate in conjunction with an online content service controlling a specific source of content, e.g., a content provider.

In an alternative implementation, systems and methods according to the principles disclosed here may provide a social networking module within such a content provider, allowing users of the content provider a degree of social interactivity. In this implementation, no reference or interaction with a rights administrator service or social networking site is necessary. Users would interact based on their own content libraries within the online content service.

Accordingly, the technology is not limited to the specific examples of implementations discussed.

In one aspect, the invention is directed towards a method of sharing information about a content item associated with a user account with a rights administrator service, including: displaying one or more entries pertaining to one or more respective content items associated with a user account with a rights administrator service; receiving a selection of a displayed item for sharing; and posting an entry associated with the selected item to a social networking module associated with the rights administrator service.

Implementations of the invention may include one or more of the following. The rights administrator service may be associated with one or more content providers. The entry may include information about the user account or may include a link to a clip of the content item. The content item may be associated with a user library on the rights administrator service, and the method may further include providing one or more recommendations of additional content items to the user based on the user library. The social networking module may include information about: a friends list associated with the user account, the friends list includes a list of friends, each having respective user accounts, at least one of the user accounts on the friends list associated with a respective friend's library on the rights administrator service; or about an influencer account having an influencer library, and the method may further include providing one or more recommendations of additional content items based on the friend's library or influencer library. The method may further include providing one or more recommendations of additional content items to users not associated with the user account. The posted entry may be selectable by a viewer of the rights administrator service, and where if selection of the posted entry results in a transaction of a product or service associated with the content item, the method may further include providing a credit to the user account or to an account associated with the user account. The method may further include creating a virtual club based on one or more user accounts associated with user libraries, the libraries bearing a similarity in metadata associated with the content items therein.

In another aspect, the invention is directed towards a non-transitory computer readable medium, includes instructions for causing a computing machine to perform the above method.

In another aspect, the invention is directed towards a method of sharing information about a content item associated with a user account with a rights administrator service, including: displaying one or more entries pertaining to one or more respective content items associated with a user account with a rights administrator service; receiving a selection of an item from the displayed entries for sharing; populating a feed with information about the selected item; and transmitting the feed to at least one social networking site.

Implementations of the invention may include one or more of the following. The feed may include tags compliant with an API exposed by a server operated by the social networking site. The feed may also include data pertaining to the user account. The rights administrator service may be associated with one or more content providers. The method may further include configuring the feed for interoperability with one or more pages supported by the social networking site so that an entry corresponding to the feed is selectable by a viewer of the site. The populating and transmitting may be performed by a interaction with an API exposed by the social networking site so that the feed is incorporated into the one or more pages as native social networking content. The populating and transmitting may be performed by a interaction with an API exposed by the social networking site so that the feed is incorporated into the one or more applications within the social networking site.

In another aspect, the invention is directed towards a non-transitory computer readable medium, includes instructions for causing a computing machine to perform the above method.

In another aspect, the invention is directed towards a method of sharing information about a content item associated with a rights administrator service, including: receiving a feed from a rights administrator service, the feed includes information about a selected content item and the feed further includes tags compliant with an API exposed by a server operated by a social networking site, where the content item is part of a user library associated with a user account with the rights administrator service; and incorporating the feed within an application on the social networking site or as an entry on one or more pages associated with a user account on the social networking site as native social networking content.

Implementations of the invention may include one or more of the following. The method may further include configuring the one or more pages, or the application, to implement one or more native social networking features. The one or more native social networking features may include one or more of: posting a comment, link, or content item. The method may further include providing one or more recommendations of additional content items based on the user library on the rights administrator service or based on the user library on the social networking site, or both. The social networking site may include information about a friends list associated with the user account, entries on the friends list associated with respective friend's libraries on the social networking site or rights administrator service, or about an influencer account having an influencer library, and the method may further include providing one or more recommendations of additional content items based on the friend's library on the social networking site or rights administrator service or on the influencer library. The method may further include receiving one or more recommendations of content items from user accounts on a user's friends list or from influencer accounts and transmitting the recommendations to the user account. The method may further include receiving data from an external site, and the providing one or more recommendations may further include basing the recommendations at least in part on the external site data. The entry may be selectable by a viewer of the social networking site, and where if selection of the entry results in a transaction of a product or service associated with the content item, the method may further include providing a credit to the user account or to an account associated with the user account. The entry may include a link to a clip of the content item. The method may further include providing one or more recommendations of additional content items or potential new friends based on the user library to users not associated with the user account and not associated with the friends list. The method may further include creating a virtual club based on one or more user libraries, the libraries bearing a similarity in metadata associated with the content items therein. The method may further include designating a user account as an influencer account, once the user account is associated with a predetermined threshold number of fans, followers, or friends.

In another aspect, the invention is directed towards a non-transitory computer readable medium, includes instructions for causing a computing machine to perform the above method.

In another aspect, the invention is directed towards a system for publishing information on a social network, including: memory bearing computer readable instructions capable of loading an application into a browser, the application being configured for browsing one or more content items from a rights administrator service; memory bearing computer readable instructions capable of receiving a selection of a content item; and memory bearing computer readable instructions capable of populating a feed usable by a social networking site to publish or post information about the selected content item.

Implementations of the invention may include one or more of the following. The system may further include memory bearing computer readable instructions capable of transmitting the feed to at least one social networking site. The feed may include at least one an asset and associated metadata, the metadata incorporating tags that comply with an API exposed by the social networking site.

Advantages may include one or more of the following. The system and method provides an interface to share information about content items in a user's library with others. The system and method enable the provision of recommendations based on analysis of the user library and other libraries. The system and method provide a way to compensate a user for sales or referred sales. The system and method promote discussion of content items such as movies, and can further promote membership of rights administrator services and sales of content.

BRIEF DESCRIPTION OF THE DRAWINGS

FIG. 6 illustrates a first exemplary structure of a computing device that may be employed to implement one or more of the features described herein, the computing device being part of a rights administrator service, a social networking site, a rights administrator service, an online content service, or the like;

FIG. 7 illustrates a second exemplary structure of a computing device that may be employed to implement one or more of the features described herein, the computing device being part of a rights administrator service, a social networking site, an online content service, or the like.

Like reference numerals indicate like elements in the drawings. Elements are not drawn to scale unless otherwise indicated.

DETAILED DESCRIPTION

Figure 1:
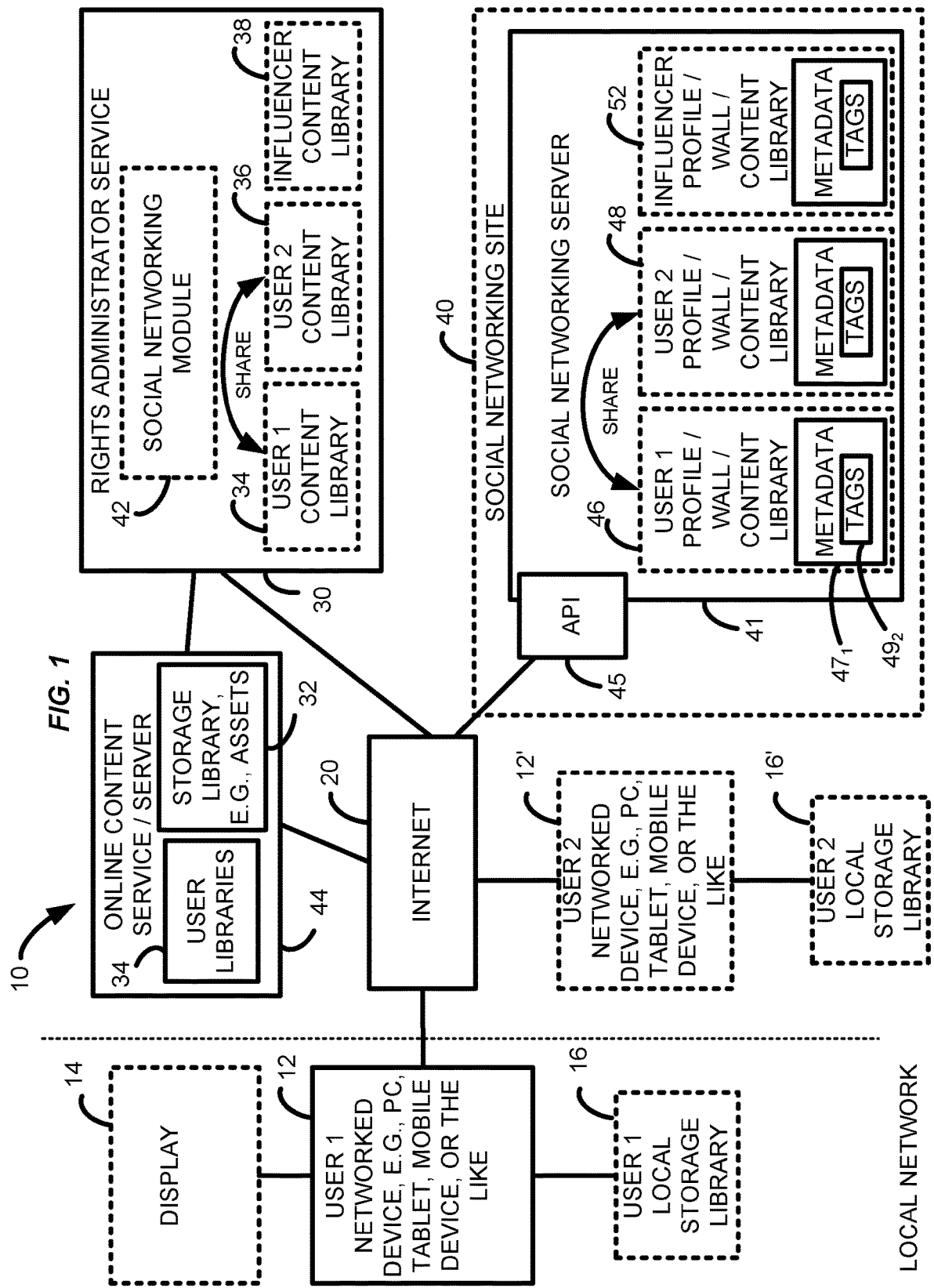
FIG. 1 is a schematic diagram of an implementation of a system of the invention.

Referring to FIG. 1, a system 10 that may implement the invention is shown. The system 10 includes a first user network device 12. The device 12 is generally some sort of computing device, e.g., a media center personal computer or other sort of computer, a notebook or handheld computer, a tablet computer, an Internet appliance, a mobile device, or the like. A basic requirement of the device 12 is that the same be able to access a rights administrator service 30, a social networking site 40, or other such aggregator of digital rights, such as an online content service 44. Such access is generally made by way of the Internet 20. The device 12 generally has a display 14 on which content items may be browsed and selected, and may further have a local storage library 16, such as a hard drive or other source of content items, such as a storage source accessible by the local network.

This system 10 further includes a second user's network device 12', which can be of the same general variety as the device 12. And similarly, the second user device 12' may have a local storage library 16' on which content items may be stored, either on the device or accessible on a local network. Through the Internet 20, the first and second users may access the rights administrator service 30, a social networking site 40, an online content service 44, and the like.

The rights administrator service 30 may be a digital rights authentication and cloud-based licensing system allowing the user 1 network device 12 and the user 2 network device 12' to stream and download purchase content to the devices 12 and 12' as well as to their local storage libraries 16 and 16', as well as to other multiple platforms and devices associated with respective user accounts. An exemplary such rights administrator service is the UltraViolet™ ("UV") system, developed and deployed by the Digital Entertainment Content Ecosystem consortium ("DECE").

Content from the rights administrator service 30 becomes accessible to a user device upon appropriate authentication and credentialing. For example, the user may have a user account with the rights administrator service 30, and the device 12 may present appropriate authentication credentials to the rights administrator service 30 to enable the download or streaming of content from the content's owner, e.g., one of the content providers associated with the rights administrator service 30.

Where the system and method are implemented as a module within an online content service 44, the content may be streamed or downloaded directly from the online content service 44, e.g., as associated with various user libraries 34 listing content items stored in the storage library 32.

The rights administrator service 30 has associated with its user accounts various user content libraries, shown as a user 1 content library 34, a user 2 content library 36, as well as an influencer content library 38. As will be described, an influencer user has an influencer user account which has attained a predetermined threshold number of followers or fans. In another implementation, a predetermined threshold number of friends on a friends list may cause the designation of influencer status. In any case, such influencers are viewed as having a particularly influential effect when making recommendations of content items. Also as will be described, users may share one or more contents of their user library with each other as indicated in the figure, and the same may be by way of a social networking module 42 associated with the rights administrator service 30.

It will be understood that a similar social networking module may be associated with the online content service 44 in another implementation. The similar social networking module may have functionality commensurate with that of the described rights administrator service, except that the rights administrator service will generally have access to content items from more than one online content service.

In an alternative implementation, social networking features of a social networking site 40 are used in combination with user content libraries on the rights administrator service 30 to enable sharing and other social networking interactive aspects within the social networking site 40. Such sharing generally takes place on user walls, shown in the figure as a user 1 profile/wall 46, a user 2 profile/wall 48, and an influencer profile/wall 52. Each user profile/wall may be associated with a content library on the social networking server 41. The content libraries on the social networking server 41 may be coincident with the content libraries on the rights administrator service 30, but also may differ. For example, a content library on the social networking site may be informed by several content libraries a user may have on several respective rights administrator services. In many cases, a content library associated with the social networking server will only include content library items from the rights administrator service that the user has chosen to post as entries on social networking pages. Thus, in general, content libraries on the social networking site may be incommensurate with content libraries on the rights administrator service.

In providing information from the rights administrator service to the social networking site, the rights administrator service will generally populate a feed with appropriate data such that the social networking site can use such data to post entries on native social networking pages. In so doing, the social networking server will generally expose an API 45 through which the feed may interact for posting. The feed will generally include metadata $47_1$ including tags $49_2$ that comply with the API exposed.

Alternatively, instead of or in addition to populating a feed for data to be displayed on native social networking pages, information from the rights administrator service may be transmitted to the social networking site for use within an application running within the social networking site.

Figure 2:
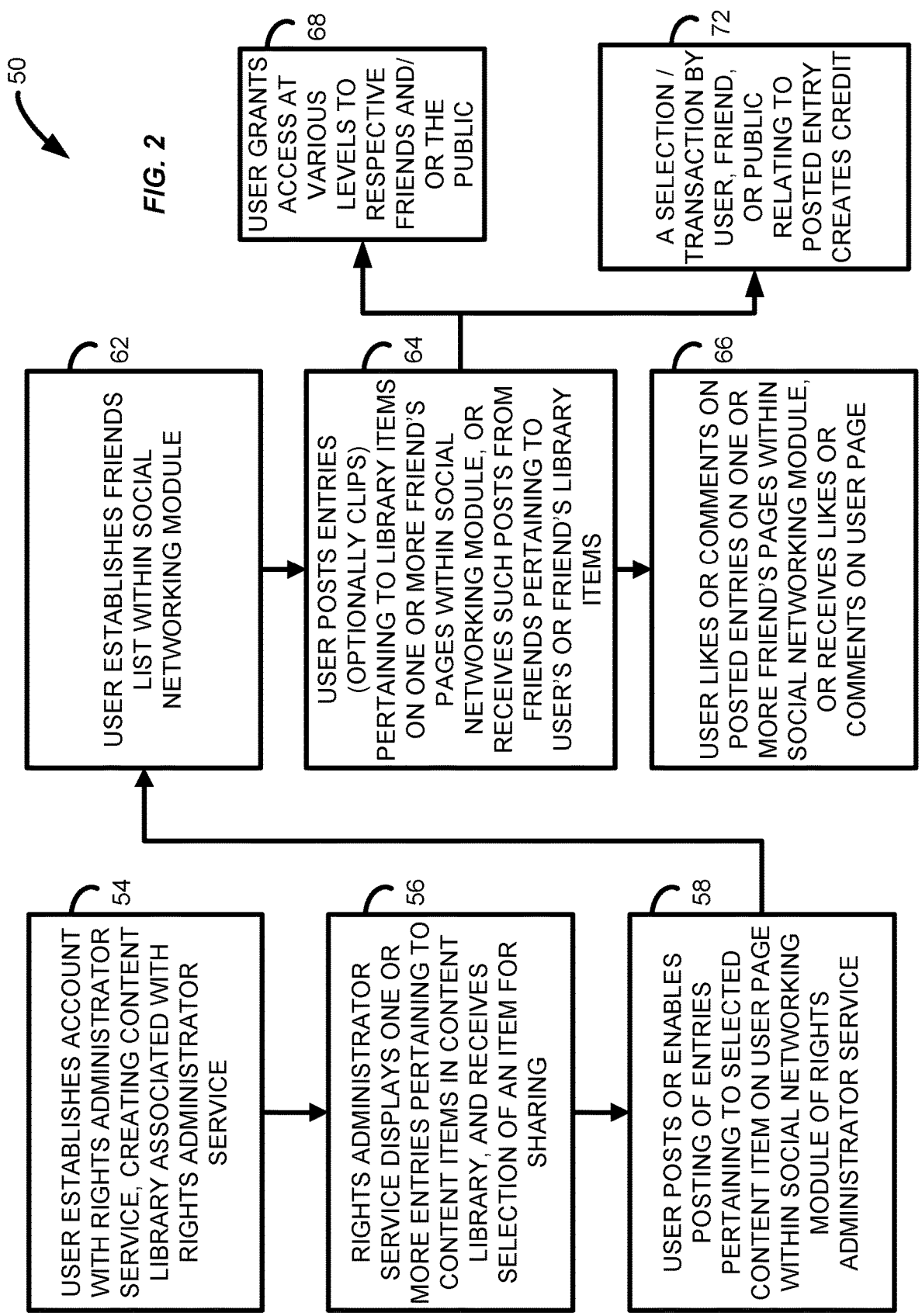
FIG. 2 is a flowchart illustrating a first implementation of a method of the invention, in particular for use of a social networking module within a rights administrator service.

Referring to FIG. 2, a flowchart 50 indicates an exemplary implementation of a method of the invention, particularly in the case where a social networking site is not accessed but where social networking features are provided by a social networking module associated with a rights administrator service. It will be understood that the same may apply where an online content service is accessed and employed.

In a first step, a user establishes an account with a rights administrator service, and creates a content library associated with the rights administrator service (step 54). The content library will generally provide access to content items from one or more online content services. The content library may be created in a number of ways, including by putting content items in a queue, favorites list, purchasing or renting content items, having content items recommended by the system or by other users, or the like.

A next step is that the rights administrator service displays one or more entries pertaining to content items in the content library, and receives a selection of an item for sharing (step 56). In this step, the rights administrator service displays entries pertaining to content items, e.g., in a list or by icons or in any other fashion. It will be understood that numerous variations of this step are possible, and that the only requirement is that enough information about a content item be displayed to enable user selection A user indicates a particular content item and will generally be provided with a menu of options such as: watching the item, queuing the item, and posting an entry corresponding to the item.

A next step is that a user posts an entry, or enables posting of an entry, pertaining to a selected content item on a user page within the social networking module of the rights administrator service (step 58). In this step, a user posts an entry corresponding to the content item on their own page. The service may provide social networking interactivity, such as by enabling the user or viewers to "like" the content item, comment on the content item, post a link about the content item, or the like.

A next step is that a user may establish a friends list within the social networking module (step 62). Such friends lists are generally groups of people known by the user and in many cases with whom they have similar interests. A next step is that the user posts entries pertaining to content items, and optionally links to clips of the content items, pertaining to items in their library on one or more friends' pages within the social networking module (step 64). Alternatively, a user may receive such posts from friends pertaining to content items in their own or one or more friends' libraries.

Users may then "like" or comment on posted entries on one or more friends pages within the social networking module, or may receive "likes" or comments on their own user page (step 66). It will be understood that a specific user page is not required; the user may receive likes or comments on whatever construct or metaphor is provided by the service and associated with the user.

A user may also grant access at various levels to respective types of viewers (step 68). For example, user accounts associated with users on a friends list may have full viewing access to a list of content items in the user's library. Alternatively, such privileges may be reserved for a "close friends" list. A user may enable the public to have such rights, or to have more limited rights, such as only being able to view categories of content within the user content library, or perhaps no access at all.

Selection of an entry by a viewer on the social networking module pertaining to a content item associated with the user, e.g., by being posted, recommended, or present in the user's content library, may lead to a benefit to the user (step 72). In this way, the user is compensated for promoting the content item. The user account may be credited in some way, or an account associated with the user account may be so credited, if a viewer or other user conducts some transaction associated with the content item, as may be attributable to the user. In some cases this may be where a click-through leads to a purchase or rental of the content item. In other cases a code associated with the user may be generated that when used in a transaction for the content item, even in a non-click through purchase or rental transaction, leads to the credit or benefit to the user. Variations of such transaction methods will be understood to one of ordinary skill in the art given this teaching.

Figure 3:
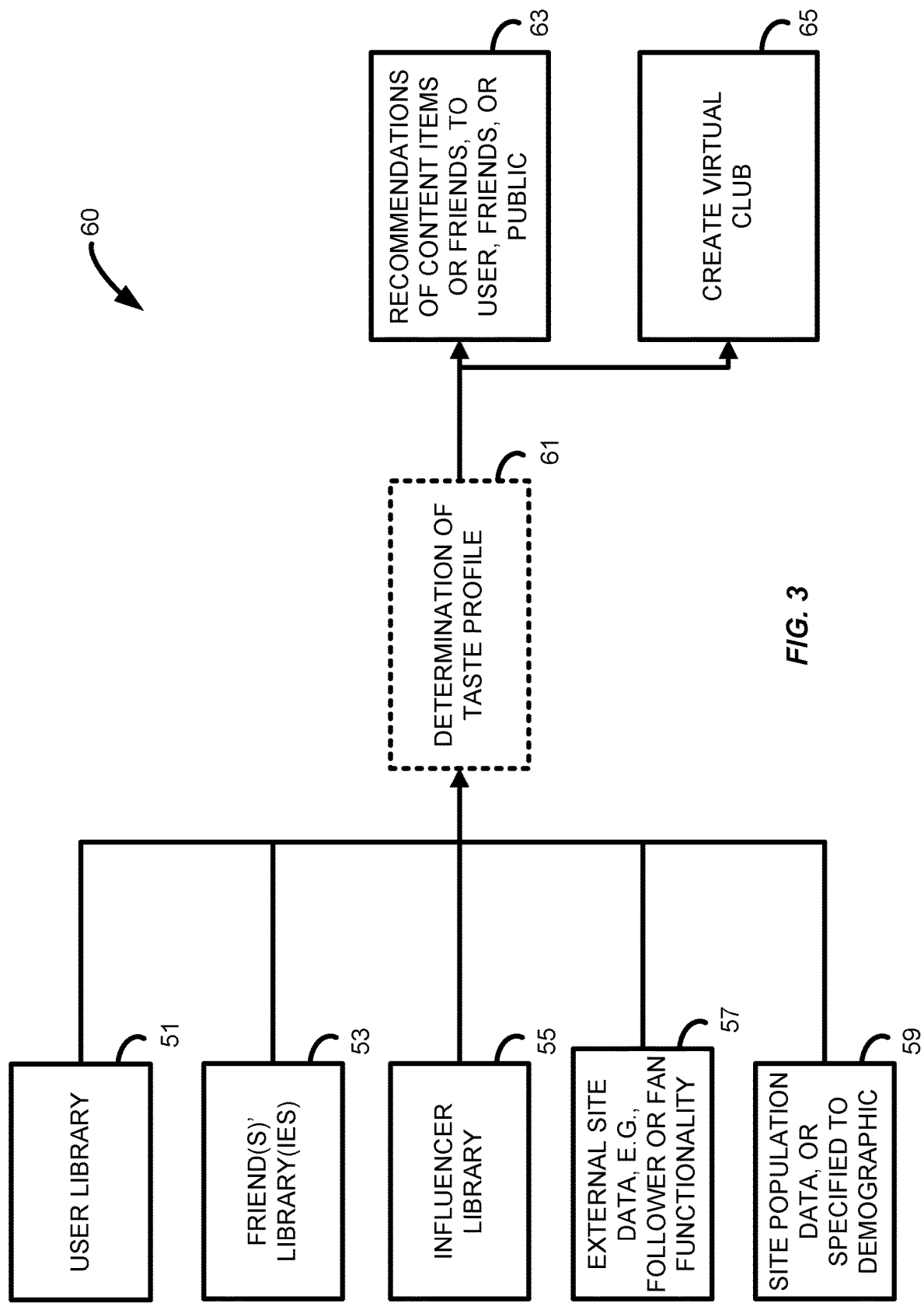
FIG. 3 is a diagram illustrating sources of information on which recommendations or virtual clubs, e.g., using determined taste profiles, may be made, either within a social networking module associated with a rights administrator service or within a social networking site, or both.

Referring to FIG. 3, a flowchart 60 illustrates how metadata or other data about content and libraries may lead to certain features, such as recommendations being made, clubs being set up, or the like. The flowchart 60 includes sources of data used for recommendations, and the same may apply whether the system and method are embodied in a rights administrator service, a online content service, a social networking site, or combinations of these.

In the figure, various entities are used to inform recommendations, e.g., of content items or of potential friends with whom a user may be interested in including on a friends list. These entities include the user's own library 51, their friends' libraries 53, one or more influencer libraries 55, data 57 from an external site, and site population data 59, which may be general or which may be specified to the user's demographic or that of their friends if such user information is available from user preferences, user profiles, or the like. Regarding the user library 51, the user's own content items may be used to provide recommendations of content items the user may be interested in, which may often include content items similar to those the user already has in their library. In the same way, as users generally have similar interests as their friends, friends' libraries may be employed in the same fashion. Influencer libraries 55 may also be so used, though the same may be less "personal" to the user. The one or more influencer libraries used may be that of an influencer the user has intended to "follow" or be a fan of, or may be one the user's friends follow, or may be one users similar to a subject user follow, as determined by comparison of user preferences and profiles, or may simply be one the system proposes as being of interest to the user for another reason.

As another source, various external site data 57 may be employed to inform recommendations. For example, external sites may provide identifications of influential actors or aspects that are not otherwise part of the rights administrator service or social networking site. For example, a world event may lead to content recommendations on a more rapid basis through an external site rather than waiting for the world event to have an effect on a user's or friends' libraries. Another source may be site population data 59. For example, if the site has a trend towards a particular content item, that content item may be recommended to particular users. In some cases, the site population data may be specified to a particular demographic, e.g., women aged 28-39.

It will be understood that other data sources may also be employed, e.g., user profile and preferences as associated with a rights administrator service, online content service, or social networking site, user purchasing behaviors, and the like.

In performing the analysis or calculation to make recommendations, metadata is generally employed for comparison, both with regard to content items and with regard to other potential data including user profiles and preferences. The metadata may be employed directly or as part of a determination of a "taste profile" of a user (step 61). Whether used directly to establish similarity, or via a proxy such as a taste profile, recommendations of content items may be made to the user, to their friends, or to the public (step 63). Besides content items, recommendations may also be made of potential friends with similar interests. A virtual club may be created using such data (step 65), with an appropriate consent requirement prior to inclusion. The virtual club may include members with similar taste profiles or otherwise determined similarities in interests in content items, e.g., fans of "The Smurfs®" movie.

Figure 4:
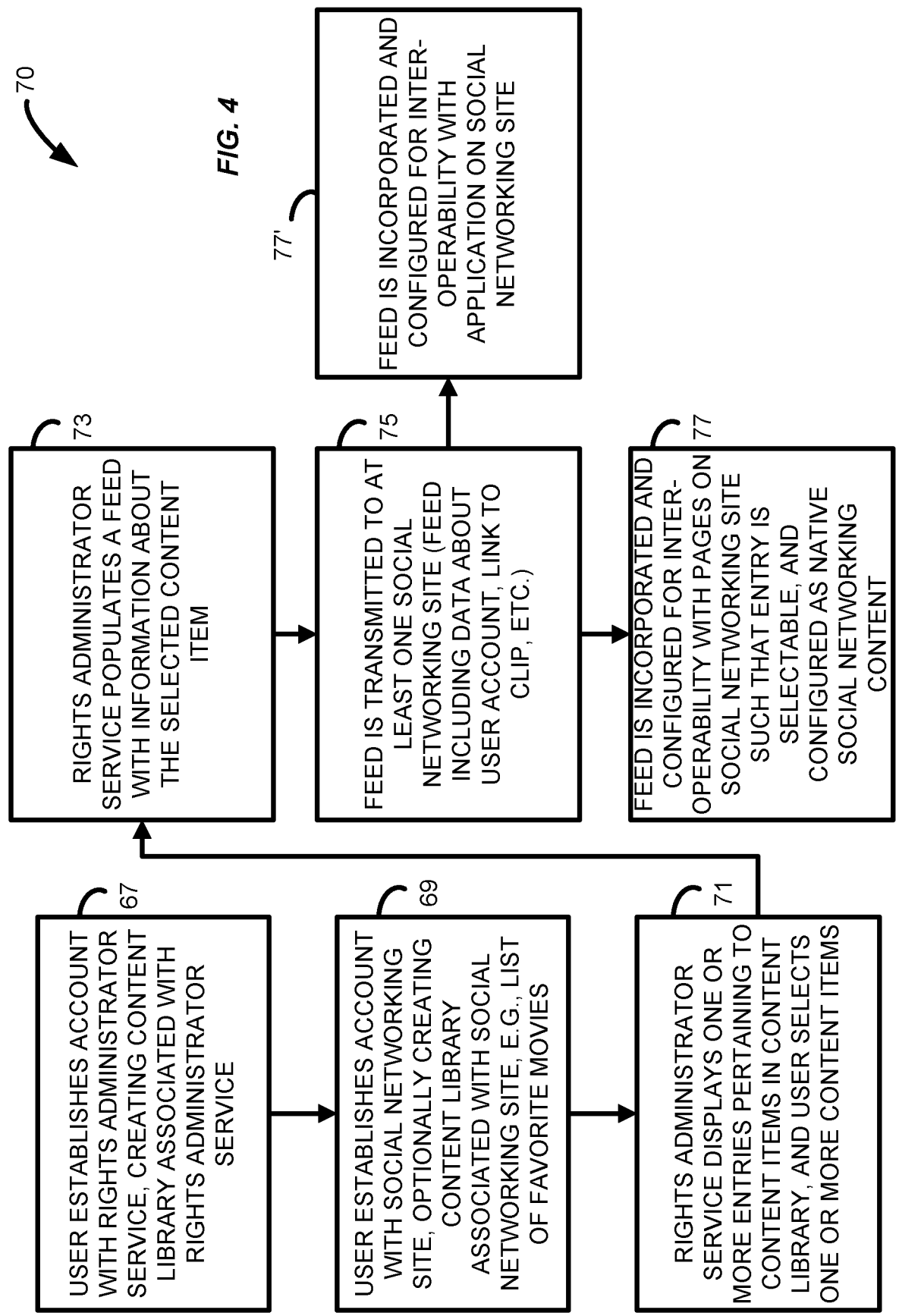
FIG. 4 is a flowchart illustrating another implementation of a method of the invention, in particular for use populating a feed for a social networking site using information from a rights administrator service.

Referring to FIG. 4, a flowchart 70 indicates an exemplary implementation of a method of the invention, particularly in the case where a social networking site is accessed in combination with a rights administrator service. The flowchart 70 particularly includes steps pertaining to providing an entry to a social networking site from a rights administrator service, including preparing the entry for posting. It will be understood that the flowchart 70 is also applicable to other implementations, including where a social networking site interacts with an online content service rather than a rights administrator service.

In a first step, a user establishes an account with a rights administrator service, and creates a content library associated with the rights administrator service (step 67). A content library may be created in a number of ways, including by putting content items in a queue, favorites list, purchasing or renting content items, or the like. As a next step, a user establishes an account with a social networking site, and optionally creates a content library associated with the social networking site (step 69). A content library may be created in a number of ways, including in the ways described above. The content library associated with the social networking site may be entirely populated by that associated with the rights administrator service, in which case the content items are the same. Alternatively, they may differ as described above.

A next step is that the rights administrator service displays one or more entries pertaining to content items in the content library, and receives a selection of an item for sharing (step 71). In this step, the rights administrator service displays entries pertaining to content items, e.g., in a list or by icons or in any other fashion as noted above. A user indicates a particular content item and will generally be provided with a menu of options such as: watching the item, queuing the item, and posting an entry corresponding to the item. As noted in step 71, the user selects one or more content items for posting on a social networking site.

The rights administrator service then populates a feed with information about the selected content item (step 73). In this way, the rights administrator service prepares the entry pertaining to the content item such that the same may be posted on a social networking site in a way compliant with an API exposed by the same. The feed is then transmitted to at least one social networking site (step 75). The feed may include data about the user account, such as to provide a separate notation of the source of the entry, e.g., notes about the user, a link to a clip of the content item, and various other features about the content item. The feed may then be incorporated and configured for interoperability with pages on the social networking site (step 77). In optional steps, the entry may be configured to be selectable by viewers, and further configured as native social networking content. In yet another implementation, the feed may be Incorporated and configured for interoperability with an application on the social networking site (step 77'). For example, the social networking site may incorporate functionality and an API for a number of applications or mini-applications that run on pages of the site. A user may even have such a mini-application for each user listed on a friends list.

Figure 5:
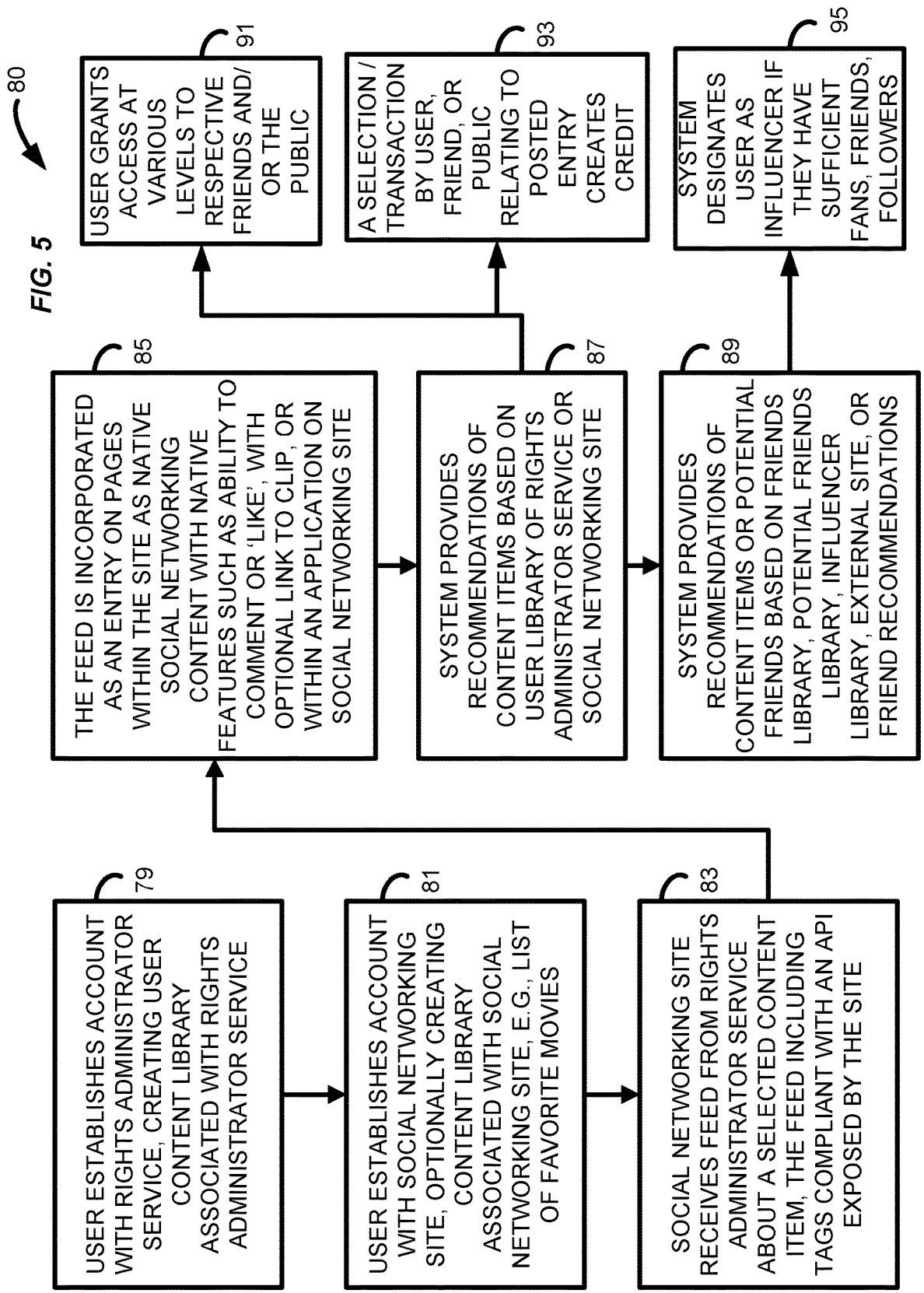
FIG. 5 is a flowchart illustrating another implementation of a method of the invention, in particular for use of a social networking site, having social interactivity about content items associated with a rights administrator service.

Referring to FIG. 5, a flowchart 80 is illustrated demonstrating exemplary steps in using posted content on a social networking site. The first steps are similar to those of FIGS. 2 and 4. In a first step, a user establishes an account with a rights administrator service, and creates a content library associated with the rights administrator service (step 79) including optionally affiliating with one or more online content services. As a next step, a user establishes an account with a social networking site, and optionally creates a content library associated with the social networking site (step 81).

A next step is that the social networking site receives a feed from the rights administrator service (or, e.g., an online content service) about a selected content item, the feed including tags compliant with an API exposed by the social networking site (step 83). This feed is provided according to, e.g., the steps described above in connection with FIG. 4. The feed may then be incorporated as an entry on pages within the social networking site as native social networking content (step 85). The pages may then incorporate native social networking features such as the ability to be commented on or to step "likes" for an entry. Optionally, a link may be provided to a clip associated with the content item. Other users may become aware of the posted entry by an application or mini-application running within the social networking site.

The system and method may then provide recommendations of content items based on the user library of the rights administrator service (or, e.g., online content service) or based on the user library on the social networking site (step 87). The recommendations may use any of the data sources described above in connection with FIG. 3. The system may further provide recommendations of content items or potential friends based on friends' libraries, potential friends libraries, influencers libraries, an external site, or direct recommendations from friends, potential friends, influencers, or the like (step 89). Again, the data sources employed may be that described above in connection with FIG. 3.

In a way similar to that of FIG. 2, the user may grant access at various levels to their list of content items and information, comments, likes, and postings thereabout (step 91). Selection of an entry by a viewer on the social networking site, pertaining to a content item associated with the user, e.g., by being posted, recommended, or present in the user's content library, may lead to a benefit to the user (step 93). In this way, the user is compensated for promoting the content item. The user account may be credited in any of the ways described above in connection with FIG. 2.

The system may further designate the user as an "influencer" if sufficient potential friends elect to follow the user as a fan or follower and/or become friends with the user (step 95). In this way, if a predetermined threshold number of followers, fans, and/or friends is attained, the user will be deemed to have sufficient influence to be considered a "taste maker" and their recommendations and in some implementations the contents of their library will be deemed to have special weight in making recommendations.

Figure 6:
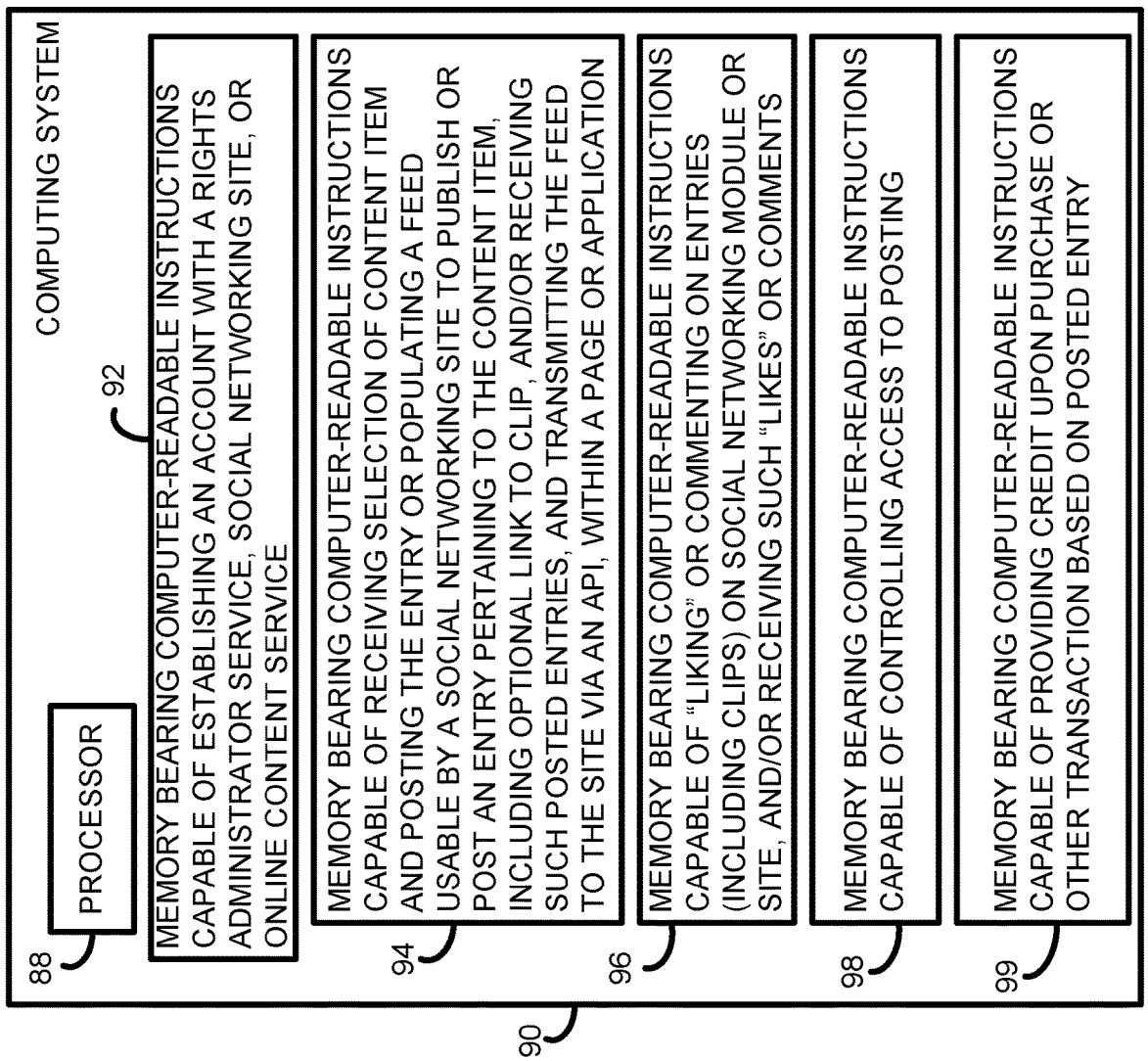

FIG. 6 illustrates a first exemplary structure of a computing system 90 that may be employed to implement one or more of the features described herein. The computing system 90 includes a processor 88 and also includes memory 92 bearing computer readable instructions capable of establishing an account with a rights administrator service, e.g., one having a social networking module, and/or a social networking site. It will be understood by one of ordinary skill in the art that a user account with an online content service is also encompassed by this teaching. The computing system 90 further includes memory 94 bearing computer readable instructions capable of receiving a selection of a content item and populating a feed usable by a social networking site to publish or post an entry pertaining to the content item, including an optional link to a clip associated with the content item, and/or receiving such posted entries, and transmitting the feed to a social networking site by interacting with an API exposed by the site. The feed may also be transmitted to the social networking site by interacting with an application or mini-application running within the social networking site. The computing system 90 also includes memory 96 bearing computer readable instructions capable of preparing the feed to include "likes" or comments on entries, including clips, on the social networking module or site, and/or receiving such "likes" or comments. The computing system 90 further includes memory 98 bearing computer readable instructions capable of controlling access to postings by granting various levels of access. The computing system 90 also includes memory 99 bearing computer readable instructions capable of providing credits upon a purchase or other transaction conducted by a viewer based on a posted entry by a user.

It will be understood that other memories may be employed to bear other pertinent information and data. Moreover, the description of specific memories should be understood to encompass configurations in which the data is held in a common memory, but in different locations within.

Figure 7:
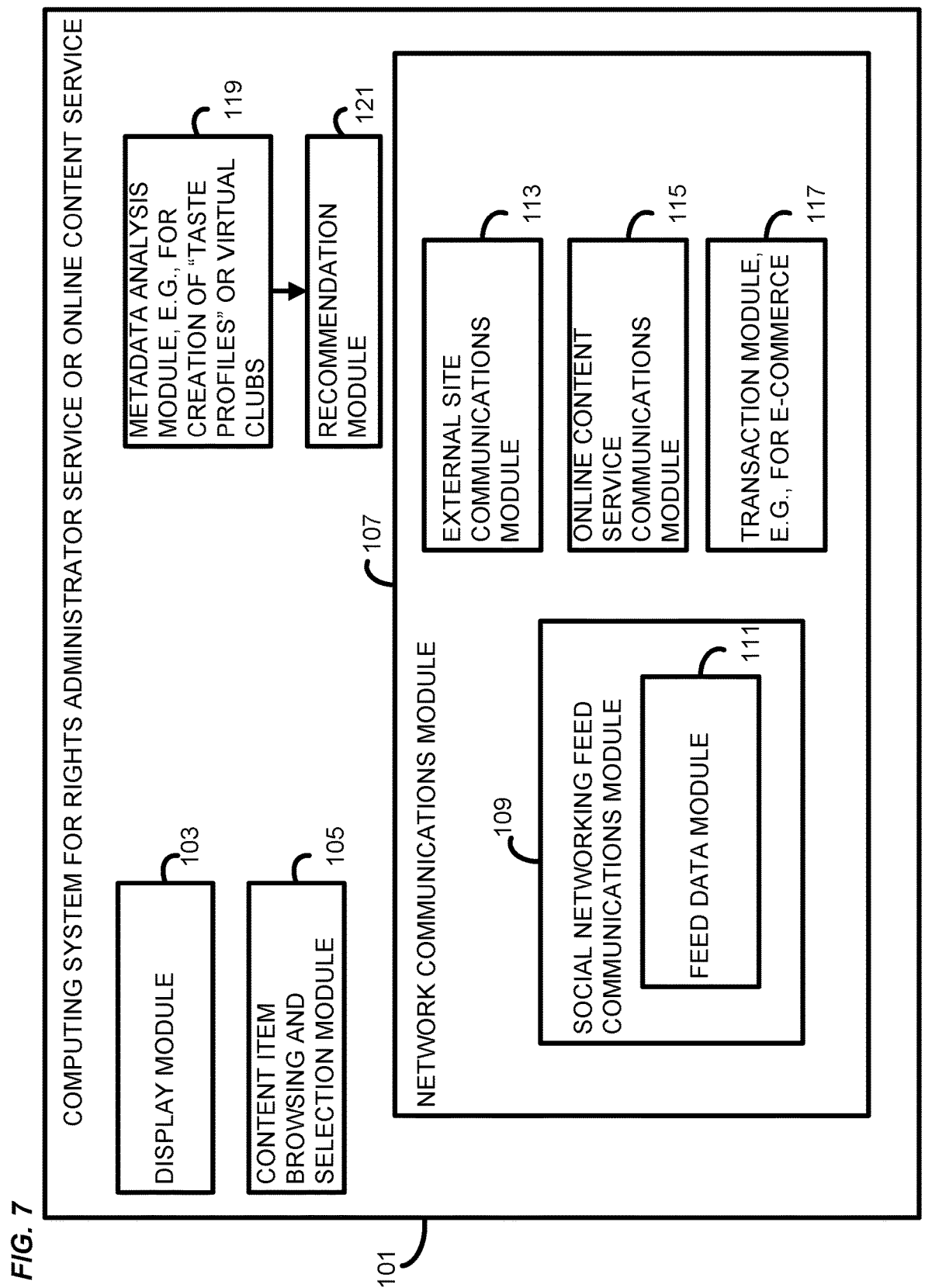

FIG. 7 illustrates a second exemplary structure of a computing system 101 that may be employed to implement one or more of the features described herein. The computing system 101 is generally part of the rights administrator service, social networking site, or online content service.

The computing system 101 includes a display module 103 for creating and formatting an appropriate display for, e.g., a list of content items or the like, on a user device. The computing system 101 further includes a content item browsing and selection module 105, for providing a browsing functionality for a user associated with the user account on the user device. The computing device 101 further includes a network communications module 107 on which communications with user devices may be performed. The network communications module 107 may include a social networking feed communications module 109 for communicating information about selected content items, and corresponding entries, to a social networking site. A feed data module 111 may form part of such social networking feed communications module to populate a feed that is compliant with an API exposed by a social networking site. Other modules within the network communications module 107 include an external site communications module 113 to communicate with an external site and receive data therefrom, an online content service communications module 115 for communicating with associated online content services, such as to receive information about libraries and selected content items as described in greater detail above, and a transaction module 117 for providing e-commerce functionality, particularly with regard to conducting transactions for viewers for content items and crediting user accounts upon the occurrence of such transactions. In many cases the transaction module 117 will not perform the transaction itself, but will perform a "handing off" of the transaction to an appropriate e-commerce site, but which may be the online content service or another D2C site. It should also be noted that where the system 101 is for a social networking module within an online content service, no separate online content service communications module 115 will generally be necessary, except in some implementations to communicate with other online content services.

Other modules within the computing system 101 include a metadata analysis module 119, for the analysis of metadata associated with content items to determine similarities and thus to provide recommendations of content items and potential friends, such recommendations provided to users by way of a recommendation module 121. The metadata analysis module 119 may also perform the creation of "taste profiles" as described above. In other implementations, the metadata analysis module 119 may be employed in the creation of virtual clubs, based on similarity of interests among users.

Variations of the computing system 101 will be apparent given this teaching. For example, where a social networking module is provided from a rights administrator service, the computing system 101 may be employed within the service to provide social networking functionality. In this case, a social networking feed communications module 119 may not be required, as the social networking module would receive user and friend data directly from the rights administrator service. Other variations are also possible. For example, not all of the modules need be located on a single system. In some cases, where the computer readable medium causes access to a web application, most or all of the modules may be on a non-local system.

Figure 8:
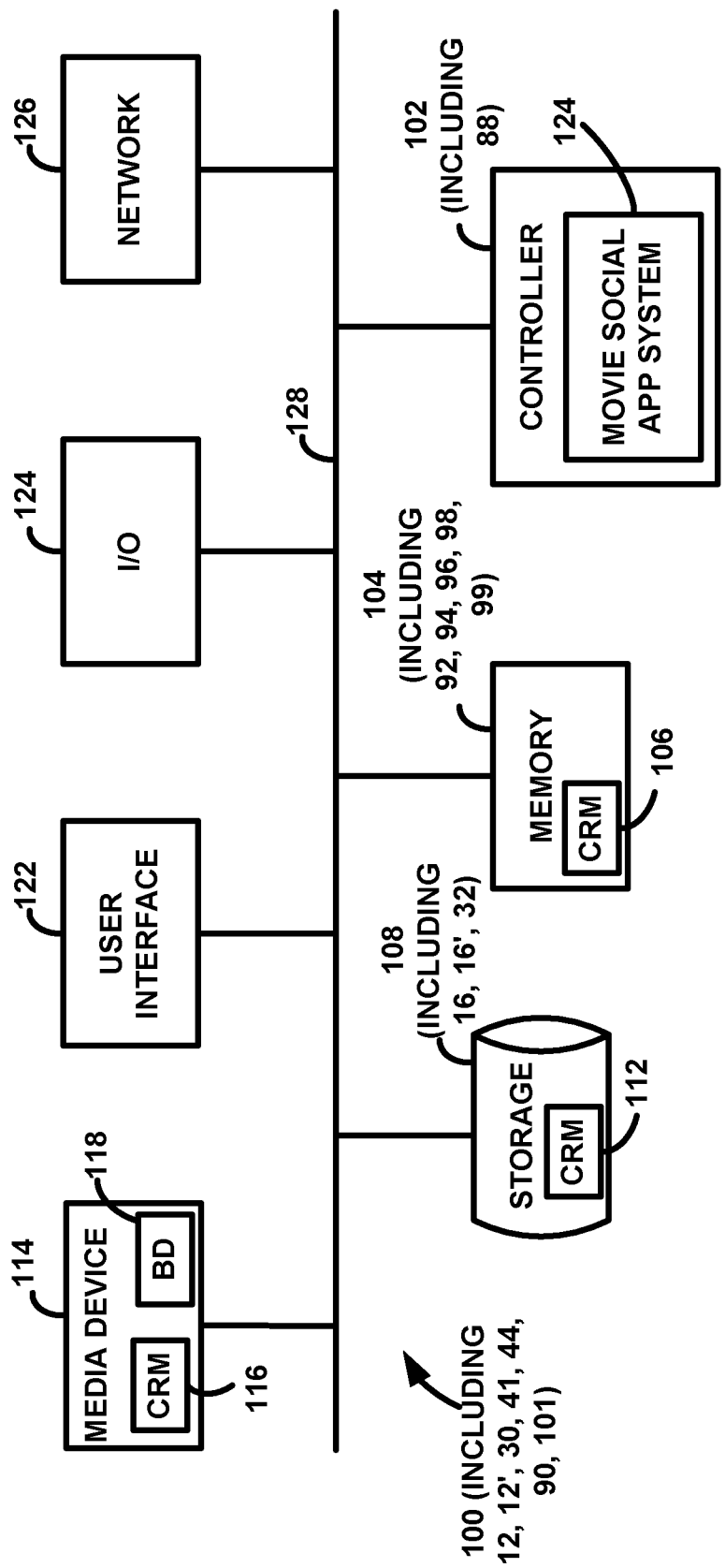
FIG. 8 illustrates a third exemplary structure of a computing device that may be employed to implement one or more of the features described herein.

FIG. 8 illustrates a third exemplary structure of a computing system 100 that may be employed to implement one or more of the features described herein. Such a computing system 100 generally includes one or more programmable processors and corresponding computer system components to store and execute computer instructions, such as to provide the rights administrator service, the online content service, the social networking site, the modules described, or the like. For example, and referring to FIG. 8, a representation of the exemplary computing device 100, e.g., PC, tablet or laptop computer, mobile device or the like (e.g., 12, 12', 30, 41, 44, 90, or 101) is illustrated. Such a device includes a memory 104, which may include a non-transitory computer readable medium 106 as well as memories 92, 94, 96, 98, and 99), a storage area 108, which may include a non-transitory computer readable medium 112 as well as storage areas 16, 16', or 32, a means 114 for receiving a computer-readable medium 116, shown in alternative exemplary form as a Blu-ray® disc player/recorder 118, a user interface 122, an input/output (I/O) interface 124, and a network interface 126 for connection to online resources. These components are interconnected by a common bus 120. Alternatively, different connection configurations can be used, such as a star pattern with the controller at the center.

A controller 102 controls the operation of the device 100 and its components. The controller 102 loads instructions from the memory 104 or an embedded controller memory (not shown) and executes these instructions to control the system. In its execution, the controller 102 may provide the system for providing a social application for interaction about movies and other content items as, in part, a software system. Alternatively, this service can be implemented as separate components in the device 100.

The memory 104 stores data temporarily for use by the other components of the device 100, such as for storing applications during their execution. In one implementation, memory 104 is implemented as RAM. In some implementations, memory 104 also includes long-term or permanent memory, such as flash memory and/or ROM.

The storage area 108 stores data temporarily or long term for use by other components of the device 100, such as for storing data used by the system for the menu application. In one implementation, storage 108 is a hard disk drive. In another, storage 108 is a solid state drive or comprises flash memory or the like.

The media device 114 receives removable media and reads and/or writes data to the inserted media. In one implementation, the media device 114 is an optical disc drive or disk burner such as a Blu-ray® drive.

A user interface 122 includes components for accepting user input from the user of the device 100 and for presenting information to the user. In one implementation, the user interface 122 includes a keyboard, a mouse, audio speakers, and a display.

The I/O interface 124 includes one or more I/O ports to connect to corresponding I/O devices, such as external storage or supplemental devices, e.g., a printer or a PDA. In one implementation, the ports of the I/O interface 124 include ports such as: USB ports, PCMCIA ports, serial ports, and/or parallel ports. In another implementation, the I/O interface 124 includes an interface for wireless communication with external devices.

The network interface 126 includes a wired and/or wireless network connection, such as an RJ-45, or WiFi interface (802.11), or an Ethernet connection. Numerous other types of network connections will be understood to be possible, including WiMax, 3G or 4G, satellite, Bluetooth®, or the like. Any of these may be employed to connect to online resources.

The device 100 and includes additional hardware and software typical of computing devices, e.g., power, cooling, operating system, though these components are not specifically shown in the figure for simplicity. In other implementations, different configurations of the device can be used, e.g., different bus or storage configurations or a multi-processor configuration.

It is to be understood that the arrangement may be implemented in any number of computing devices, including laptop computers, desktop computers, tablet computers, handheld computers, mobile phones, smart phones, Internet appliances, and the like.

Systems and methods have been described to provide social networking interactivity about content items, e.g., movies, television shows, and the like. The examples described above are intended to be illustrative and not limiting, and variations of the system are possible as well. For example, various types of content can be shared, such as television or Internet video, audio, games, books, or physical objects, e.g., clothing or devices.

Besides the implementations described above as primarily a social networking module within a rights administrator service, or as a service which interacts with a social networking site using information from a rights administrator service, implementations will also be understood where the system according to the principles described operates in conjunction with online content services to provide social networking functionality. While the system has been described with respect to including a provision for "likes" to be notated about an entry, indicating approval by a viewer, it will be understood that this concept may be applied to any such notation.

Accordingly, the technology is not limited to the specific examples discussed above, which are provided only as example forms of implementing the claims.

The invention claimed is:

1. A method of sharing information about a content item associated with a rights administrator service, comprising:
    receiving a feed from a rights administrator service, the feed including information about a content item and
    the feed further including tags compliant with an API exposed by a server operated by a social networking site, wherein the content item is part of a user library associated with a user account with the rights administrator service; and
    incorporating the feed within an application on the social networking site or as an entry on one or more pages associated with a user account on the social networking site as native social networking content;
    wherein the social networking site includes information about an influencer account having an influencer library, and further comprising providing one or more recommendations of additional content items based on the influencer library.

2. The method of claim 1, further comprising configuring the one or more pages, or the application, to implement one or more native social networking features.

3. The method of claim 2, wherein the one or more native social networking features include one or more of: posting a comment, link, or content item.

4. The method of claim 1, further comprising providing one or more recommendations of additional content items based on the user library on the rights administrator service or based on the user library on the social networking site, or both.

5. The method of claim 4, wherein the social networking site includes information about a friends list associated with the user account or about entries on the friends list associated with respective friend's libraries on the social networking site or rights administrator service, and further comprising providing one or more recommendations of additional content items based on the friend's library on the social networking site or rights administrator service.

6. The method of claim 1, further comprising receiving one or more recommendations of content items from user accounts on a user's friends list or from influencer accounts, and transmitting the recommendations to the user account.

7. The method of claim 1, further comprising receiving data from an external site, and further comprising providing one or more additional recommendations based at least in part on the external site data.

8. The method of claim 1, wherein the entry is selectable by a viewer of the social networking site, and wherein if selection of the entry results in a transaction of a product or service associated with the content item, further comprising providing a credit to the user account or to an account associated with the user account.

9. The method of claim 1, wherein the entry includes a link to a clip of the content item.

10. The method of claim 1, further comprising providing one or more recommendations of additional content items or potential new friends based on the user library to users not associated with the user account and not associated with the friends list.

11. The method of claim 1, further comprising creating a virtual club based on one or more user libraries, the libraries bearing a similarity in metadata associated with the content items therein.

12. The method of claim 1, further comprising designating a user account as an influencer account, once the user account is associated with a predetermined threshold number of fans, followers, or friends.

13. The method of claim 1, wherein the rights administrator service is associated with one or more content providers.

14. A non-transitory computer readable medium, comprising instructions for causing a computing machine to perform the method of claim 1.

15. A method of sharing information about a content item associated with a rights administrator service, comprising:
   receiving a feed from a rights administrator service, the feed including information about a selected content item and the feed further including tags compliant with an API exposed by a server operated by a social networking site, wherein the content item is part of a user library associated with a user account with the rights administrator service; and
   incorporating the feed within an application on the social networking site or as an entry on one or more pages associated with a user account on the social networking site as native social networking content;
   wherein the social networking site includes information about an influencer account having an influencer library, and wherein the content item is selected based at least in part on the influencer library.

16. The method of claim 15, further comprising providing one or more recommendations of additional content items based on the user library on the rights administrator service or based on the user library on the social networking site, or both.

17. The method of claim 15, wherein the social networking site includes information about a friends list associated with the user account or about entries on the friends list associated with respective friend's libraries on the social networking site or rights administrator service, and further comprising providing one or more recommendations of additional content items based on the friend's library on the social networking site or rights administrator service.

18. The method of claim 15, further comprising receiving data from an external site, and further comprising providing one or more additional recommendations based at least in part on the external site data.

19. The method of claim 15, wherein the entry is selectable by a viewer of the social networking site, and wherein if selection of the entry results in a transaction of a product or service associated with the content item, further comprising providing a credit to the user account or to an account associated with the user account.

20. The method of claim 15, wherein the entry includes a link to a clip of the content item.

21. The method of claim 15, further comprising designating a user account as an influencer account, once the user account is associated with a predetermined threshold number of fans, followers, or friends.

* * * * *